United States Patent
Ito et al.

(10) Patent No.: US 6,489,732 B2
(45) Date of Patent: Dec. 3, 2002

(54) DISCHARGE LAMP LIGHTING CIRCUIT

(75) Inventors: Masayasu Ito, Shizuoka (JP); Hitoshi Takeda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/777,096

(22) Filed: Feb. 5, 2001

(65) Prior Publication Data

US 2002/0047644 A1 Apr. 25, 2002

(30) Foreign Application Priority Data

Feb. 10, 2000 (JP) ...................................... 2000-033071

(51) Int. Cl.[7] .............................................. H05B 37/02
(52) U.S. Cl. .......................... 315/308; 315/82; 315/307
(58) Field of Search ...................... 315/DIG. 5, DIG. 7, 315/82, 127, 128, 224, 225, 291, 307, 308

(56) References Cited

U.S. PATENT DOCUMENTS

| 5,142,203 A | 8/1992 | Oda et al. ................... 315/308 |
| 5,151,631 A | 9/1992 | Oda et al. ................... 315/127 |
| 5,572,094 A | 11/1996 | Yamashita et al. .......... 315/308 |
| 5,629,588 A | * 5/1997 | Oda et al. ................... 315/308 |
| 6,002,215 A | * 12/1999 | Yamashita et al. .......... 315/308 |
| 6,034,487 A | * 3/2000 | Yamashita et al. .......... 315/244 |
| 6,034,490 A | * 3/2000 | Yamashita et al. .......... 315/310 |
| 6,340,870 B1 | * 1/2002 | Yamashita et al. .......... 315/308 |
| 6,351,074 B1 | * 2/2002 | Ito et al. ....................... 315/82 |

* cited by examiner

Primary Examiner—Tho Phan
(74) Attorney, Agent, or Firm—Fish & Richardson, P.C.

(57) ABSTRACT

The discharge lamp lighting circuit is structured such that positive and negative polarity voltages separately generated from two output terminals of a DC power source circuit are sent to the DC-AC conversion circuit 4. To switch these output voltage, a plurality of switch elements provided in a DC-AC conversion circuit are alternately operated by drive circuits. The resultant AC voltage is supplied to the discharge lamp. A current detection element is provided in the DC power source circuit, and the signal from the element is received by the current detection circuit to conduct current detection.

9 Claims, 6 Drawing Sheets

DISCHARGE LAMP LIGHTING CIRCUIT

BACKGROUND OF THE INVENTION

1. Field of the Invention

The present invention relates to a lighting circuit for supplying an AC voltage to a discharge lamp by converting a DC voltage from a DC power source circuit. The circuit has a current detection means to detect a current flowing to the discharge lamp in the DC power source circuit.

2. Related Art

A lighting circuit for a discharge lamp, having a DC power source circuit, a DC-AC conversion circuit, and a starter circuit, is known.

For example, a lighting circuit has a DC-DC converter in the DC power source circuit, and a DC-AC converter containing a driver circuit and a full bridge circuit having two pairs of semiconductor switch elements for conducting switching control. The output voltage of the DC-DC converter is converted into a rectangular wave-shaped voltage by the full bridge circuit and supplied to the discharge lamp.

To detect a current flowing to the discharge lamp, a shunt resistance is inserted between the discharge lamp and the ground, and a signal after voltage conversion is detected.

However, the above configuration is subject to a surge voltage and may face safety problems.

When a discharge lamp is lighted, a surge voltage may be generated by a distributed or stray capacitor. For a mobile lighting circuit, a high voltage pulse of several kV's to tens of kV's generated by a starter circuit is sent to the discharge lamp through a high voltage cord. A shield is wrapped around the cord to suppress electromagnetic interferences brought on by the generation of radio frequency noise. The stray or distributed capacity are also charged between the high voltage cord and the car body or the shield, both at ground. Thus, when the discharge lamp breaks down and conducts after receiving the high voltage pulse, the electrical charge accumulated in the stray capacity or the distributed capacity discharges through the shunt resistance. Consequently, the shunt resistance or elements of the current detection circuit provided downstream to the resistance can be damaged.

Further, if the wiring between the shunt resistance and the discharge lamp short circuits by contacting, for example, the car body, the current stops flowing through the shunt resistance and flows out through the car body (ground potential). Since no current is flowing to the discharge lamp, the control circuit ramps the power supply to provide more current to the discharge lamp. A fail-safe circuit then detects the above condition to stop the operation. Circuits such as a fail-safe circuit increase costs, size, and the number of parts of the lighting circuit.

SUMMARY OF THE INVENTION

According to the present invention, a discharge lamp lighting circuit comprises a DC power source circuit to output a DC voltage, a DC-AC conversion circuit for converting the DC voltage into an AC voltage to be supplied to a discharge lamp, a current detection circuit to detect a current flowing to the discharge lamp, and a control circuit to control the output voltage of the DC power source circuit based on a status detection signal of the discharge lamp including a detection signal from the current detection circuit. The present invention can have the following structures, (A) to (C).

(A) A positive polarity voltage and a negative polarity voltage respectively from two output terminals of the DC power source circuit are sent to the DC-AC conversion circuit. A plurality of switch elements provided in the DC-AC conversion circuit for switching these output voltages are alternately operated by their driving circuits to generate AC voltage, which is supplied to the discharge lamp.

(B) One electrode of the discharge lamp is connected to one of the output terminals of the DC-AC conversion circuit through an inductive load, and the other electrode is connected to the ground.

(C) A current detection element to detect a current flowing to the discharge lamp is provided in the DC power source circuit, and a signal from the current detection element is received by the current detection circuit.

According to the present invention, the current detection element for detecting a current flowing to the discharge lamp is provided in the DC power source circuit and not connected to the discharge lamp. For example, the element may be inserted between the output terminal and the ground. Thus, problems associated with the surge voltage generated when the discharge lamp is lighted can be averted. Also, a protection circuit for protecting circuits is not needed because the current can be detected by the current detection element even if the current leaks to the car body.

DETAILED DESCRIPTION OF THE INVENTION

Figure 1:
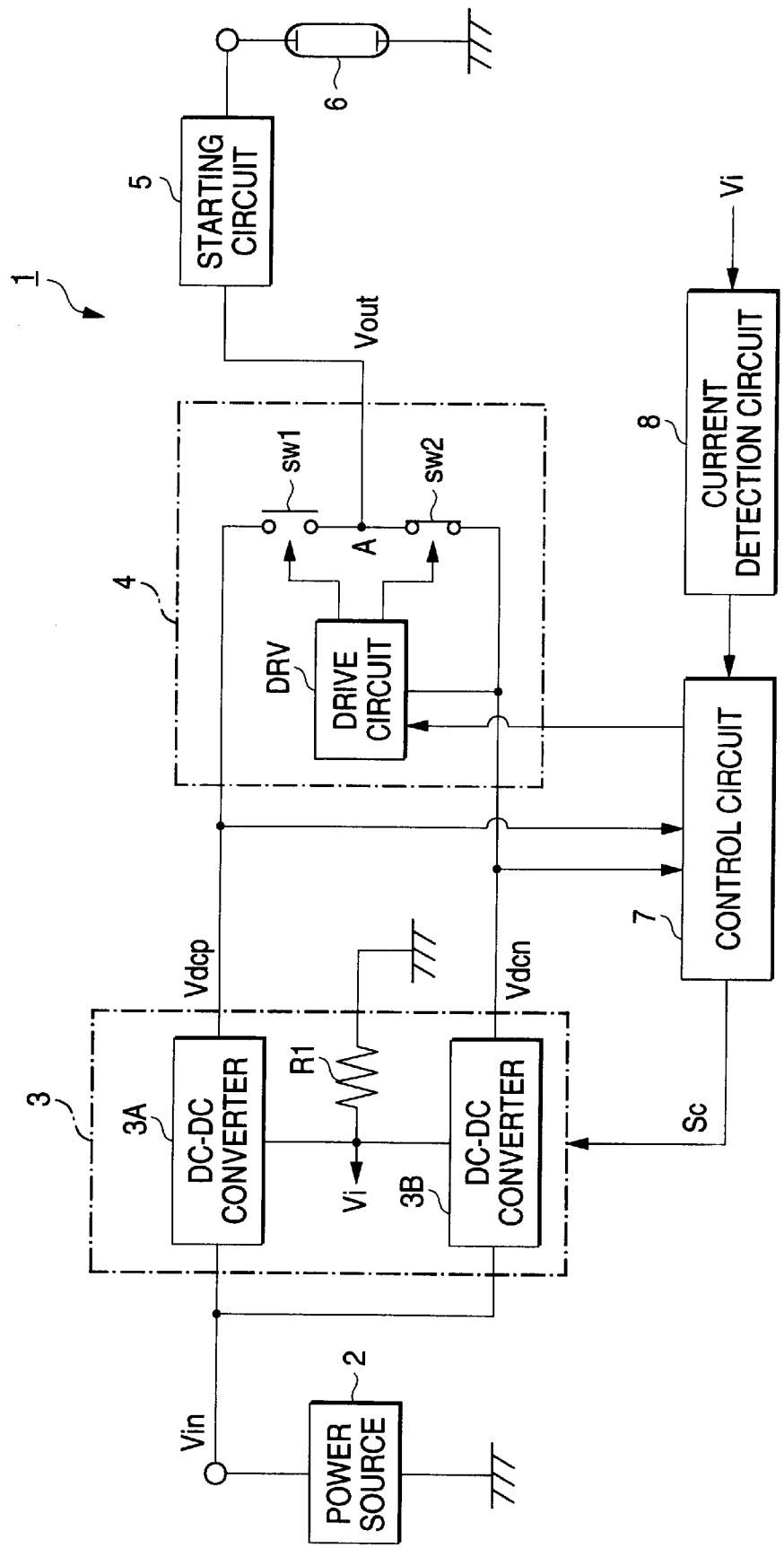
FIG. 1 is an exemplary circuit block diagram of a discharge lamp lighting circuit according to the present invention.

FIG. 1 shows an exemplary discharge lamp lighting circuit for one discharge lamp according to the present invention.

The discharge lamp lighting circuit 1 has a power source 2, a DC power source circuit 3, a DC-AC conversion circuit 4, and a starter circuit 5, and controls the lighting of a discharge lamp 6 (metal halide lamp, or the like).

The DC power source circuit 3 receives a DC input voltage Vin from the power source 2 and generates a desired DC output voltage, which is variably controlled corresponding to a control signal from a control circuit 7. A switching regulator is used in a DC-DC converter in the DC power source circuit 3. The DC-DC converter can be a chopper or fly back type. A DC-DC converter 3A generates a positive polarity output (positive potential to the ground), and a DC-DC converter 3B generates a negative polarity output (negative potential to the ground). That is, the present circuit generates a bipolar output voltage of positive and negative polarity. The positive polarity and negative polarity voltages separately generated from two output terminals are sent to the DC-AC conversion circuit 4.

Figure 2:
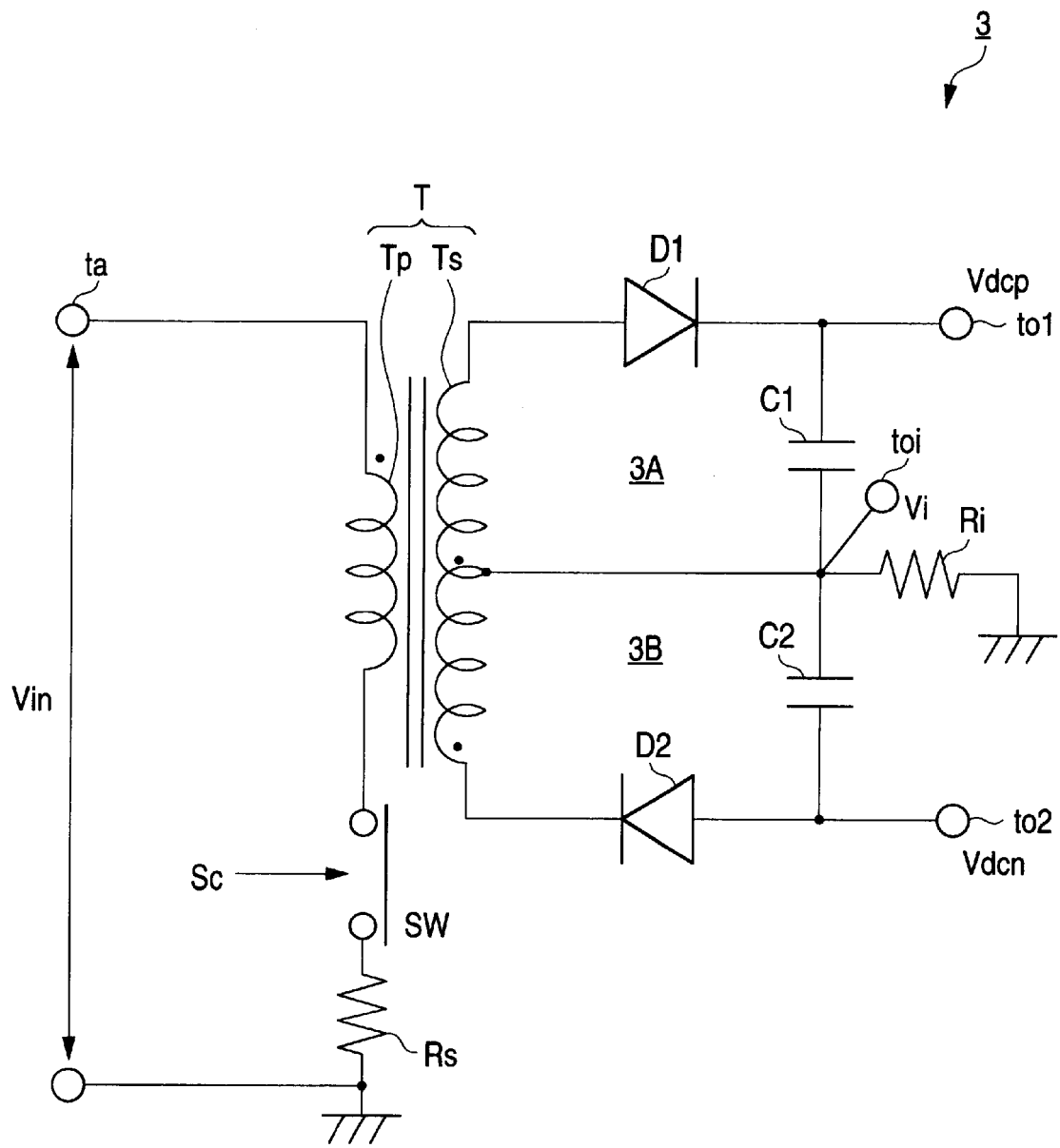
FIG. 2 is an exemplary circuit diagram of a DC power source circuit according to the present invention.

FIG. 2 shows an exemplary DC power source circuit 3. One end of a primary coil Tp of a transformer T is connected to a DC input terminal ta, where the voltage Vin is applied. The other end of the primary coil Tp is grounded through a semiconductor switch element SW and a current detection resistance Rs. In FIG. 2, the switch SW shown by a switch sign can be a field effect transistor (FET). A signal Sc from a control circuit 7 is supplied to a control terminal of the semiconductor switch element SW (if an FET, to a gate) to control the element SW.

One end of a secondary coil Ts of the transformer T is connected to the anode of a diode D1. The cathode of the diode D1 is connected to one end of a capacitor C1. The other end of the capacitor C1 is connected to an intermediate tap of the secondary coil Ts, and is grounded through a current detection element Ri to obtain a detection signal for the current flowing to the discharge lamp. A positive polarity output voltage Vdcp is taken out from a terminal to1 at the node of the capacitor C1 and the diode D1.

Further, the other end of the secondary coil Ts is connected to the cathode of a diode D2. The anode of the diode D2 is connected to one end of a capacitor C2, and connected to the terminal to2. The negative polarity output voltage Vdcn is obtained through the terminal to2. The other end of the capacitor C2 is grounded through the current detection element Ri.

As stated before, the DC power source circuit 3 has a converter 3A including the transformer T, the diode D1, and the capacitor C1, and the converter 3B including the transformer T, the diode D2, and capacitor C2, and the positive polarity and the negative polarity voltage Vdcp, Vdcn are respectively generated from two output terminals to1 and to2. The current corresponding to the current flowing to the discharge lamp can be detected by the voltage conversion from the current flowing through the current detection element Ri, and from the detection terminal toi connected to the node of the capacitors C1 and C2. A detection signal Vi is thus obtained.

A mark "." on the transformer T indicates a start point of the coil. For example, in the secondary coil Ts, the mark "." indicates the start point of the coil at the end close to the diode D2. Another mark indicate the start point at the intermediate tap.

In FIG. 2, as the current detection element, the resistive element Ri is inserted between the output terminal of the DC power source circuit 3 and the ground The capacitors C1 and C2 are also inserted. However, the present invention is not limited to this configuration. A Hall element or a MR (magnetic resistance) can be used to detect the current flowing to the discharge lamp. However, in terms of costs and size, a resistive element may be most practical.

The positive and negative polarity voltages from the DC power source circuit 3 are sent to the DC-AC conversion circuit 4. As shown in FIG. 1, a pair of semiconductor switch elements sw1 and sw2, which can be FETs, switches the output voltages Vdcp and Vdcn of the DC power source circuit 3. An AC voltage generated when each element is alternately operated by the drive circuit DVR, is supplied to the discharge lamp 6 through the inductive load of the starter circuit 5.

That is, sw1 is connected to the output terminal of the converter 3A and connected to the output terminal of the converter 3B through sw2. For the drive circuit DRV to reciprocally control these switching elements, an integrated circuit (IC) is used as a half bridge driver. The alternate operation of the half bridge is conducted so that, based on the signal respectively supplied from the drive circuit DRV to the control terminal of each switch element, when the element sw1 is on, the element sw2 is turned off, and reversibly, when element sw1 is off, the element sw2 is turned on. In this way, a DC voltage is converted into an AC voltage. The drive circuit DRV is operated according to the negative polarity voltage Vdcn. Accordingly, the power source voltage for the drive circuit DRV is necessary. Further, also for the control signal sent from the control circuit 7 to the drive circuit DRV, the same consideration is necessary.

The starter circuit 5 generates a high voltage signal for initiating the lighting of the discharge lamp. The high voltage signal is superimposed on the AC voltage Vout generated from the DC-AC conversion circuit 4 and applied to the discharge lamp 6. For example, consider a circuit with a capacitor or a switch element such as a self-yielding switch element or a thyristor controlled by external signals in the primary circuit of the transformer, which includes a magnetic substance (core) and a primary coil and a secondary coil. If the discharge lamp 6 is started and when the voltage across the both terminals of the capacitor exceeds its threshold capacitive charge, or subsequently, when a trigger signal is received, the switch element conducts and the current flows to the primary coil of the transformer. Thus, the high voltage signal is applied to the discharge lamp through the secondary coil.

In FIG. 1, the discharge lamp 6 is connected to a node A of the switch elements sw1 and sw2 of the DC-AC conversion circuit 4 through the inductive load, which is the secondary coil of the trigger transformer or the inductor in the starter circuit 5. The other side of the discharge lamp 6 is connected to the ground.

The current detection circuit 8 is provided to obtain the detection signal for the current flowing to the discharge lamp 6. A signal Vi from the current detection element Ri is received.

Figure 3:
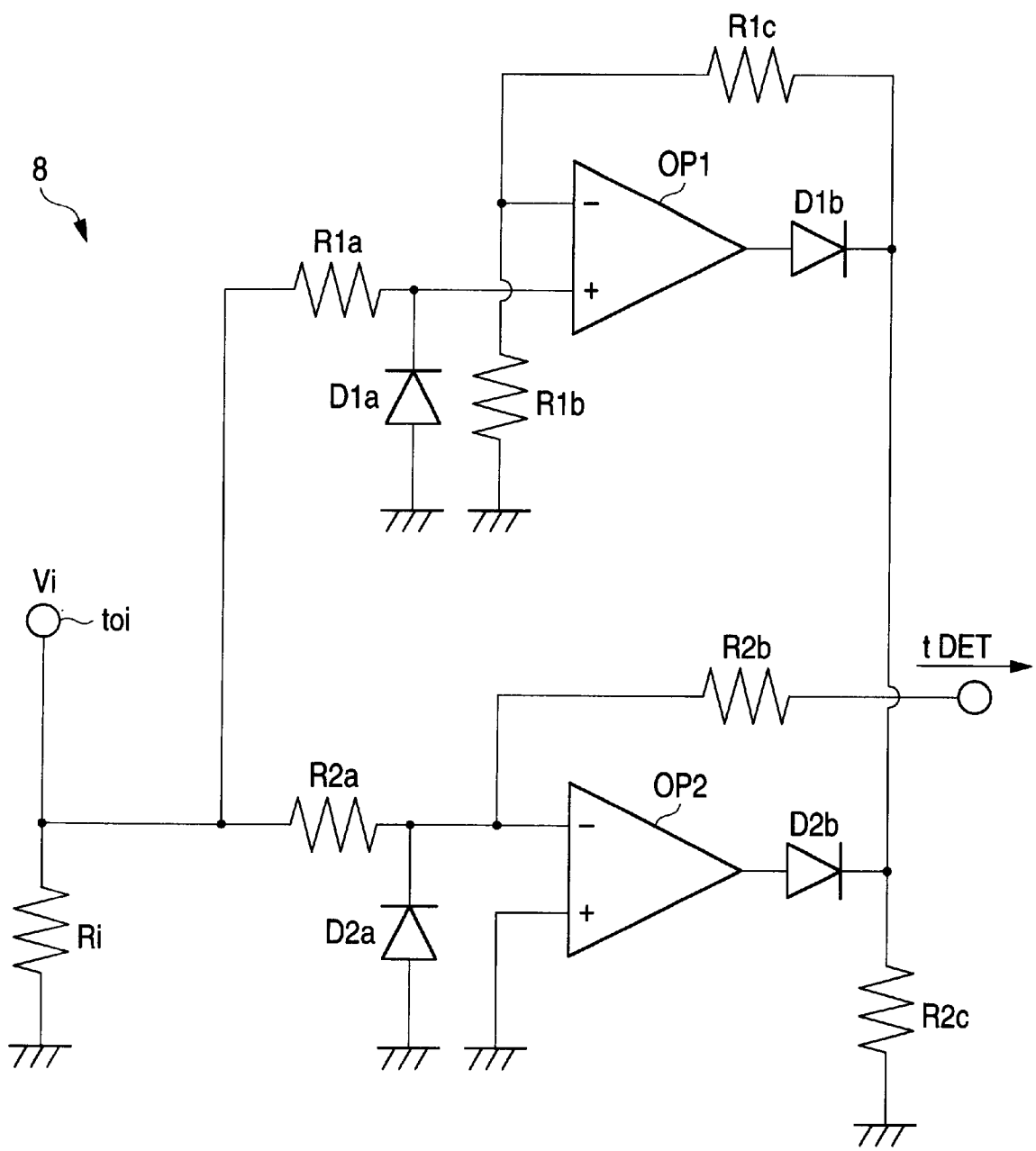
FIG. 3 is an exemplary circuit diagram of a current detection circuit according to the present invention.

FIG. 3 shows a non-reversal amplifier circuit and a reversal amplifier circuit provided in parallel with each other. The voltage drop is due to the current detection resistance Ri. The output voltage is selected from one or the other circuit.

An operational amplifier OP1 is in the non-reversal amplifier circuit. The non-reversal input terminal is connected to the detection terminal toi (a node between the current detection resistance Ri and the smoothing capacitors C1 and C2) through the resistance R1a. The cathode of a diode D1a is connected to the non-reversal input terminal of the operational amplifier OP1, and its anode is grounded. The diode D1a and the diode D2a protect the operational amplifier when the input voltage to the operational amplifier is reversed to a negative value.

The output terminal of the operational amplifier OP1 is connected to the anode of the diode D1b, and the cathode of the diode D1b is connected to the current detection output terminal tDET and grounded through the resistance R2c. Then, the reversal input terminal of the operational amplifier OP1 is grounded through the resistance R1b and connected to the cathode of the diode D1b through the resistance R1c. The resistance values of the resistances R1a, R1b, and R1c are the same.

The operational amplifier OP2 is in the reversal amplifier circuit. The reversal input terminal is connected to the detection terminal toi through the resistance R2a. The cathode of a diode D2a is connected to the reversal input terminal of the operational amplifier OP2, and its anode is grounded.

The output terminal of the operational amplifier OP2 is connected to the anode of the diode D2b, and the cathode of the diode D2b is connected to the current detection output terminal tDET and grounded through the resistance R2c. The reversal input terminal of the operational amplifier OP2 is connected to the cathode of the diode D2b through the resistance R2b, and non-reversal input terminal of the operational amplifier OP2 is grounded. The value of R2 is set to two times the value of the resistance R2a.

The value of voltage drop in the current detection resistance Ri is amplified by a factor of two by the operational amplifier OP1 in the non-reversal amplifier circuit. On the other hand, it is negatively amplified by a factor of two by the operational amplifier OP2 in the reversal amplifier circuit. The higher voltage of the two is selected by the diodes D1b and D2b provided at the output terminal of each operational amplifier, and the selected voltage is taken out from the current detection output terminal tDET. That is, for a positive supply voltage to the discharge lamp, an output voltage is obtained from the operational amplifier OP1 at the output terminal tDET. For a negative supply voltage to the discharge lamp, an output voltage is obtained from the operational amplifier OP2 at the output terminal tDET. The detection voltage obtained as described above is used to determine whether the discharge lamp 6 is turned on or to discriminate the status of the discharge lamp 6 and to regulate the electric power supply.

The control circuit 7 in FIG. 1 controls the output voltage of the DC power source circuit 3 in correspondence with the status detection signal of the discharge lamp 6, including the detection signal from the current detection circuit 8. For example, the detection signal according to the tube voltage of the discharge lamp or its corresponding signal Vdcp or Vdcn, other than the detection signal according to the tube current of the discharge lamp, are entered into the control circuit 7 as a status detection signal according to the lighting status of the discharge lamp 6. For example, after the electric power exceeding the rated electric power is supplied for accelerating the emission during the initial lighting of the discharge lamp, the electric power supply is controlled based on the detection signal to decrease gradually. The system is then controlled to reach smoothly a constant rated electric power. A known circuit structure adapted for the pulse width modulation (PWM) control method can be used for the present circuit.

The current detection element, which can be a resistive element, to detect the current flowing to the discharge lamp can be inserted between the output terminal of the DC power source circuit 3 and the ground. Because the current flowing through the current detection element is detected by the current detection circuit 8, the electrical charge accumulated in the stray or distributed capacity does not flow through the current detection element even if the discharge lamp breaks down. That is, the accumulated electrical charge directly flows from the discharge lamp to the ground. Further, even if current leaks to the car body, the lighting circuit is not subject to an erroneous signal by the current detection. Further, because no special protection circuit is needed, the size of the circuit can be reduced.

Figure 4:
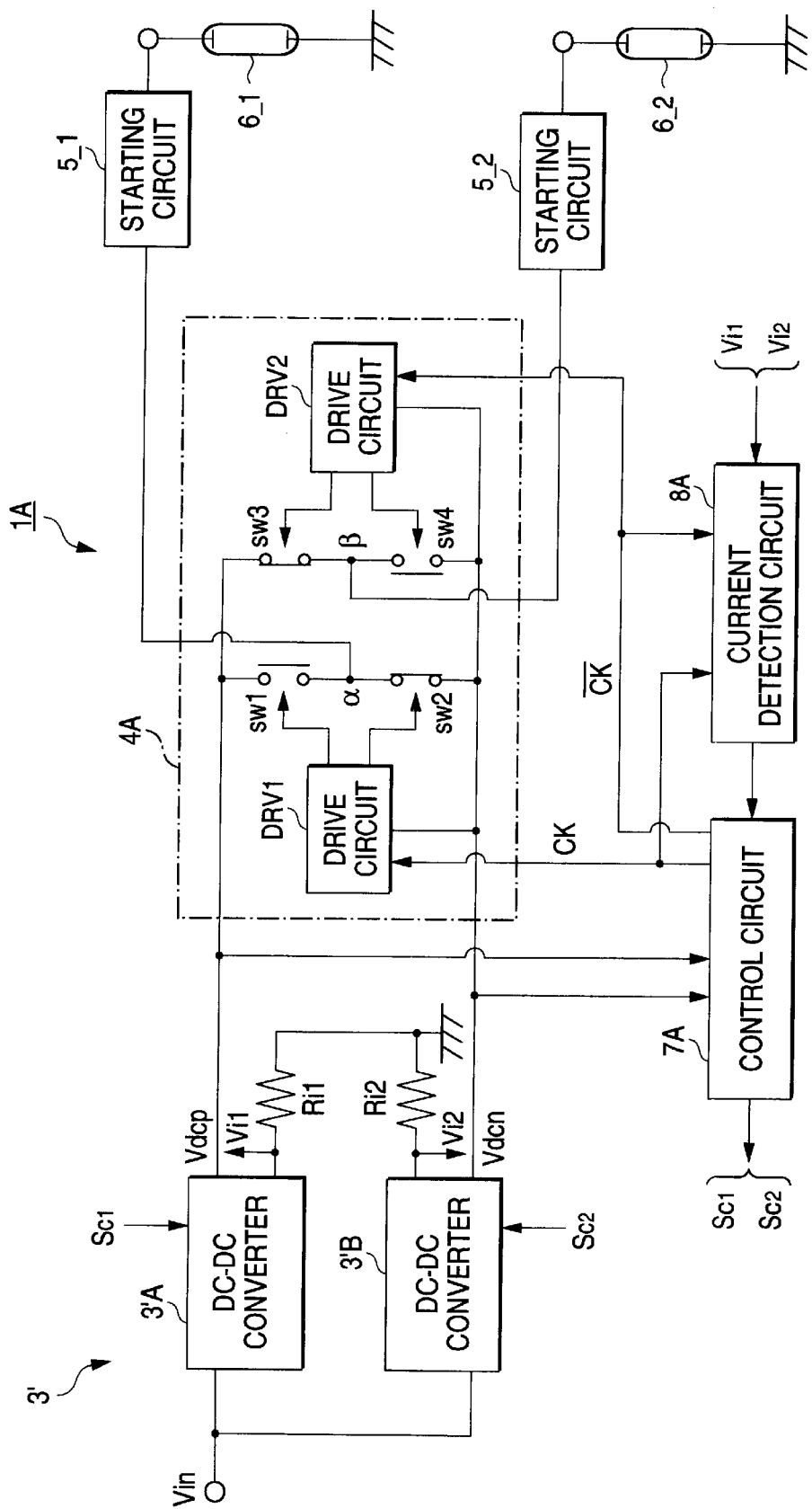
FIG. 4 is an exemplary lighting circuit for two discharge lamps according to the present invention.

FIG. 4 shows an exemplary circuit for two discharge lamps 6-1, and 6-2 turned on by a common lighting circuit 1A.

A DC power source circuit 3' comprises a DC-DC converter 3'A for a positive polarity output and a DC-DC converter 3'B for a negative polarity output.

Figure 5:
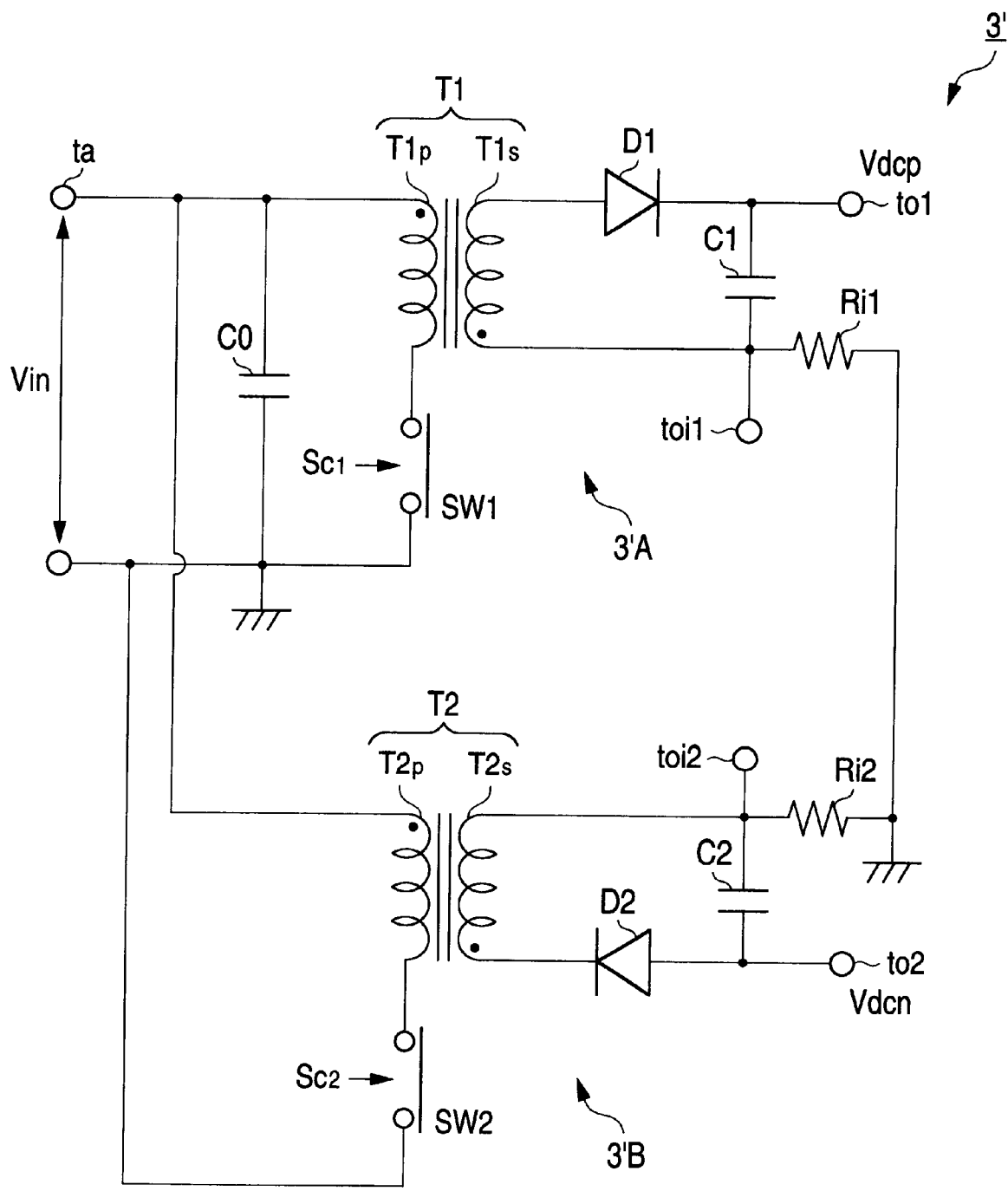
FIG. 5 is another exemplary circuit diagram of a DC power source circuit according to the present invention.

FIG. 5 illustrates an exemplary DC power source circuit 3', which has two transformers T1 and T2. The transformer T1 has a primary coil T1p and a secondary coil T1s. The transformer T2 has a primary coil T2p and a secondary coil T2s.

Each terminal of the primary coils T1p and T2p is connected to the DC input terminal ta, and each opposite terminal of T1p and T2p is grounded through semiconductor switch elements SW1 and SW2, respectively. The switch elements SW1 and SW2, which can be separately turned on or off, are controlled by the control signals Sc1 and Sc2. Thus, each of the secondary outputs can be independently and variably controlled.

A capacitor C0 provided in parallel with the primary coils T1p and T2p is connected to the DC input terminal ta, and the opposite end of the capacitor C0 is grounded.

The DC-DC converter 3'A includes the transformer T1 and switch element SW1, the rectifying diode D1 connected to the secondary coil T1s and smoothing capacitor C1, and a current detection resistance Ri1. One end of the secondary coil T1s is connected to the anode of the diode D1. The cathode of the diode is connected to the output terminal to1 and connected to one end of the capacitor C1. The other end of the capacitor C1 is connected to the secondary coil T1s and is grounded through the current detection resistance Ri1.

The current flowing to the primary coil T1p of the transformer T1 is controlled by the on/off control of the switch element SW1 according to the control signal Sc1, and the positive polarity voltage Vdcp is obtained at the output terminal to1 from the secondary coil T1s through the diode D1 and capacitor C1. A terminal toi1 is a current detection terminal connected to a node of the capacitor C1 and the current detection resistance Ri1.

On the other hand, the DC-DC converter 3'B includes the transformer T2 and switch element SW2, and rectifying diode D2 connected to the secondary coil T2s and smoothing capacitor C2, and the current detection resistance Ri2. That is, one end of the secondary coil T2s is connected to the cathode of the diode D2. The anode of the diode D2 is connected to the output terminal to2 and connected to one end of the capacitor C2. The other end of the capacitor C2 is connected to the secondary coil T2s and is grounded through the current detection resistance Ri2.

The current flowing to the primary coil T2p of the transformer T2 is controlled by the on/off control of the switch element SW2 according to the control signal Sc2, and the voltage Vdcn is obtained at the output terminal to2 from the secondary coil T2s through the diode D2 and capacitor C2. A terminal toi2 is a current detection terminal connected to a node of the capacitor C2 and the current detection resistance Ri2.

As shown in FIG. 4, the DC-AC conversion circuit 4A with a full bridge type circuit comprises four semiconductor switch elements sw1, sw2, sw3, and sw4.

The switch elements sw1 and sw2 are serially connected to each other. One end of sw1 is connected to the output terminal of the DC-DC converter 3'A, and the other end is connected to the output terminal of the DC-DC converter 3'B through the switch element sw2. The first discharge lamp 6-1 is connected to a node α of both switch elements through the starter circuit 5-1, that is through the inductive load in the circuit 5-1.

The switch elements sw3 and sw4 are serially connected to each other. One end of sw3 is connected to the output terminal of the DC-DC converter 3'A, and the other end is connected to the output terminal of the DC-DC converter 3'B through the switch element sw4. The second discharge lamp 6-2 is connected to a node β of both switch elements through the starter circuit 5-2, that is through the inductive load of the circuit 5-2.

Each of the electrode terminals of discharge lamps 6-1 and 6-2 that is not connected to either the node α or β is grounded.

An integrated circuit (IC) for a half bridge driver is used for drive circuits DRV1 and DRV2. The polarity of the bridge is regulated by receiving the signal CK from the control circuit 7A and a logical NOT signal CK-bar, respectively. These signals can be easily obtained by dividing the rectangular wave-shaped clock signal generated from the signal generation circuit, which generates a reference signal, by using a flip-flop or counter circuit.

The drive circuit DRV1 in the DC-AC conversion circuit 4A controls the on/off control of the switch elements sw1 and sw2. The drive circuit DRV2 controls the on/off control of the switch elements sw3 and sw4. When the switch element sw1 is turned on and the switch element sw2 is turned off by the drive circuit DRV1, the switch element sw3 is turned off and the switch element sw4 is turned on by the drive circuit DRV2. Further, when the switch element sw1 is turned off and the switch element sw2 is turned on status by the drive circuit DRV1, the switch element sw3 is turned on and the switch element sw4 is turned off by the drive circuit DRV2. In this manner, the switch elements sw1 and sw4 are in the same status and the switch elements sw2 and sw3 are in the same status. These switches are reciprocally and alternately operated.

Accordingly, by the on/off operation of two pairs of the switch elements, while the positive polarity voltage is supplied to the first discharge lamp 6-1, the negative polarity voltage is supplied to the second discharge lamp 6-2. Conversely, while the negative polarity voltage is supplied to the first discharge lamp 6-1, the positive polarity voltage is supplied to the second discharge lamp 6-2.

Figure 6:
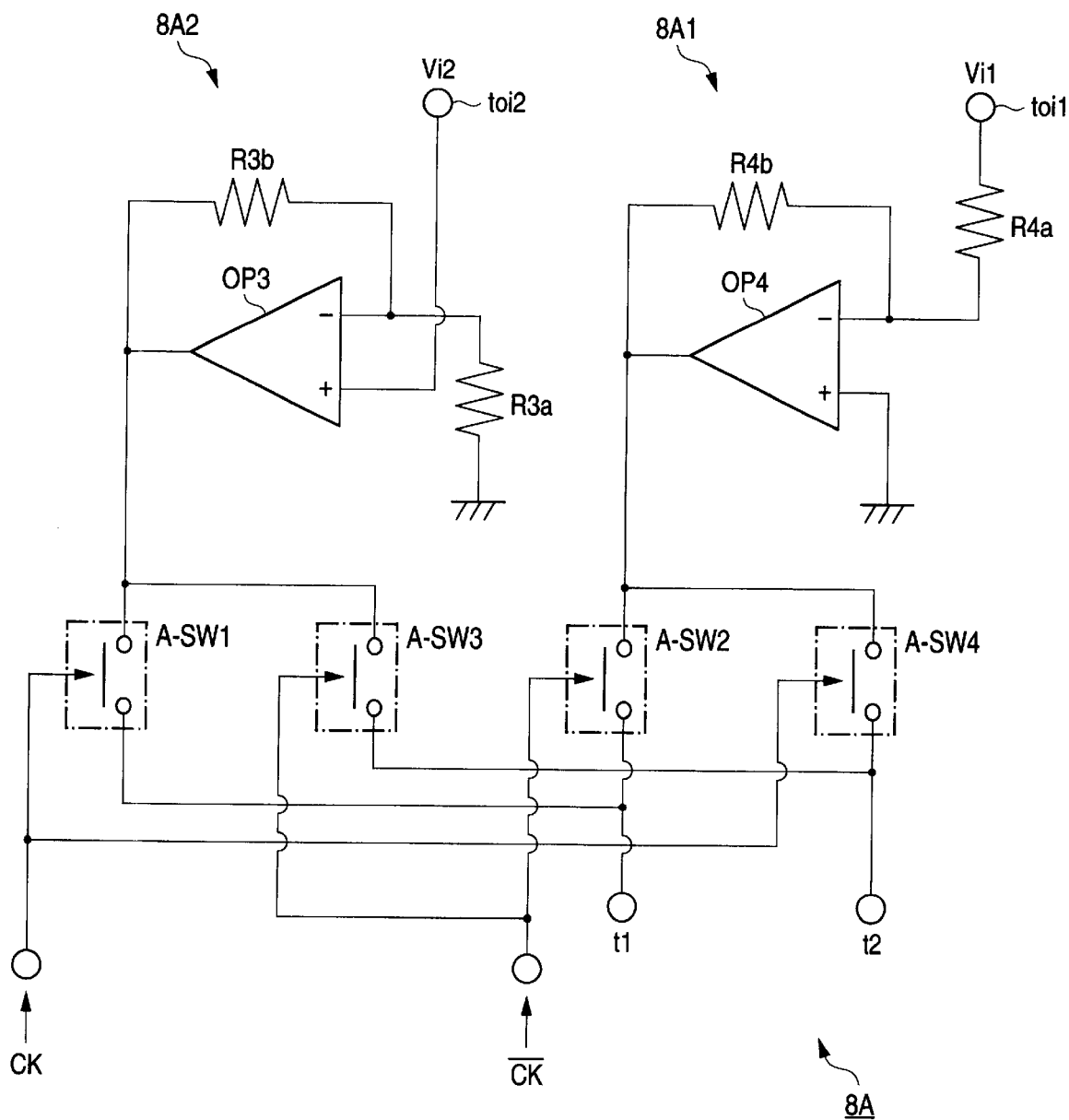
FIG. 6 is another exemplary circuit diagram of a current detection circuit according to the present invention.

FIG. 6 shows an exemplary current detection circuit 8A comprising a detection circuit 8A1, which receives a signal Vi1, and a detection circuit 8A2 which receives a signal Vi2. The output of each circuit is switched corresponding to the signal CK and its inverse signal. Compared to having a pair of the detection circuit shown in FIG. 3, the number of elements would be less.

In the detection circuit 8A2, the detection voltage Vi2 is obtained from the detection terminal toi2 as a terminal voltage of the current detection resistance Ri2 provided in the DC-DC converter 3'B. The detection voltage Vi2 is supplied to the non-inverse input terminal of the operational amplifier OP3. The inverse input terminal of the operational amplifier OP3 is grounded through the resistance R3a, which is inserted between the output terminal and the inverse input terminal.

Two analog switches A-SW1 and A-SW3, which can be FETs are provided in the output voltage of the operational amplifier OP3. When the switch A-SW1 receives the signal CK and turns on, the output voltage is drawn from the current detection terminal t1 for the discharge lamp 6-1. When the switch A-SW3 is turned on by the inverse signal CK-bar, the output voltage is drawn from the current detection terminal t2 for the discharge lamp 6-2.

For the detection circuit 8A1, the detection voltage is obtained from a detection terminal toi1 as a terminal voltage of the current detection resistance Ri1 provided in the DC-DC converter 3'A. The detection voltage is supplied to the inverse input terminal of the operational amplifier OP4 through the resistance R4a. The non-inverse input terminal of the operational amplifier OP4 is grounded. The resistance R4b is inserted between the output terminal and the inverse input terminal of the operational amplifier OP4.

Two analog switches A-SW2, and A-SW4 are provided for the output voltage of the operational amplifier OP4. When the analog switch A-SW2 receives the inverse signal of the signal CK and turns on, the output voltage is drawn from the current detection terminal t1 for the discharge lamp 6-1. When the analog switch A-SW4 turns on by receiving the signal CK, the output voltage is drawn from the current detection terminal t2 for the discharge lamp 6-2.

As described above, the reason why the detection terminals can be separated for each discharge lamp is that a positive polarity voltage can be supplied to one discharge lamp while a negative polarity voltage can be supplied to another discharge lamp. For example, in FIG. 4, when the signal CK is at a low level, the switch element sw1 is on and the switch sw2 is off, and the positive polarity voltage is supplied to the discharge lamp 6-1. In this case, the switch element sw3 is off and the switch element sw4 is on. Because the analog switch A-SW2 is on and the analog switch A-SW1 is off, the detection voltage (positive voltage) detected from the current detection resistance Ri1 is drawn from the operational amplifier OP4 to the detection terminal t1. And because the analog switch A-SW3 is on and the analog switch A-SW4 is off, the output voltage (positive voltage) amplified by the operational amplifier OP3 to the detection voltage by the current detection resistance Ri2 is drawn from the detection terminal t2.

The signal from the detection terminal is, for example, sent to the control circuit 7A. Control signals Sc1 and Sc2 are generated to control the output voltage for each of DC-DC converters 3'A and 3'B. That is, the output voltage of each converter in FIG. 5 is controlled when the switch element respectively connected to the primary coil of each transformer receives the control signal for on/off-control.

For the control circuit 7A, for part other than using the above detection signal according to a tube current of the discharge lamp, a circuit comprising operational amplifiers such as in JP-A-4-141988, incorporated herein by reference, may be used to control the electric power supply to the discharge lamp according to the detection signal of a tube voltage of the discharge lamp or according to the detection signal obtained by dividing the output voltage Vdcp or Vdcn of each DC-DC converter by a resistance.

After an execessive power is supplied to the discharge lamp during the initial lighting period, exceeding the rating according to the control curve of the tube voltage—tube current characteristic diagram of the discharge lamp, the supplied power is controlled by the circuit 7A to decrease gradually and to reach a constant rated electric power.

According to the present invention, the current detection element for detecting the current flowing to the discharge lamp is not connected to the discharge lamp but provided in the DC power source circuit. Thus, break-down of circuit elements because of a surge voltage generated during the discharge lamp lighting can be prevented. Also, the property of filter elements provided for reducing the effect of the surge can be downgraded. Further, since current does not leak through the detection element to give incorrect results, a protection circuit not necessary. Thus, the number of parts or costs are reduced. Further, the size of the apparatus can be reduced.

A less complicated detection circuit can be provided if a resistive element is used as a current detection element and is inserted between the output terminal of a DC power source circuit and the ground.

The lighting circuit structure can be simplified by having a detection circuit to detect a current flowing to a first current detection element and a detection circuit to detect a current flowing to a second current detection element to detect currents for each of discharge lamps separately.

What is claimed is:

1. A discharge lamp lighting circuit comprising:
   a DC power source circuit configured to generate positive and negative polarity DC voltages;
   a DC-AC conversion circuit, coupled to the DC power source circuit, for supplying an AC voltage converted from the positive and negative polarity DC voltages to the discharge lamp;
   a current detection circuit to detect a current flowing to the discharge lamp; and
   a control circuit to control the output voltage of the DC power source circuit according to a status detection signal of the discharge lamp including a detection signal from the current detection circuit;
   wherein a current detection element to detect the current flowing to the discharge lamp is provided in the DC power source circuit, and a signal from the current detection element is sent to the current detection circuit.

2. The discharge lamp lighting circuit according to claim 1 further comprising: a plurality of switch elements provided in the DC-AC conversion circuit and alternately operated by driving circuits to switch between the positive and negative polarity voltages.

3. The discharge lamp lighting circuit according to claim 1 wherein the discharge lamp is connected to the DC-AC conversion circuit through an inductive load.

4. The discharge lamp lighting circuit according to claim 1, wherein the current detection element is a resistive element inserted between the output terminal of the DC power source circuit and a ground.

5. The discharge lamp lighting circuit according to claim 1 wherein the DC power source circuit has a positive polarity output terminal to output a positive polarity output voltage and a negative polarity output terminal to output a negative polarity output voltage.

6. The discharge lamp lighting circuit according to claim 1 wherein the DC power source circuit is connected to two discharge lamps through a plurality of switch elements in the DC-AC conversion circuit.

7. The discharge lamp lighting circuit according to claim 1 further comprising:
   a first current detection element inserted between a positive polarity output terminal of the DC power source circuit and a ground, and
   a second current detection element inserted between a negative polarity output termninal of the DC power source circuit and a ground.

8. The discharge lamp lighting circuit according to claim 7 wherein the current detection circuit comprises:
   a detection circuit to detect the current flowing in the first current detection element and a detection circuit to detect the current flowing in the second current detection element.

9. The discharge lamp lighting circuit according to claim 1 further comprising:
   a starting circuit disposed between and electrically coupled to the DC-AC conversion circuit and the discharge lamp.

* * * * *